(12) United States Patent
Maschio

(10) Patent No.: US 12,433,181 B2
(45) Date of Patent: Oct. 7, 2025

(54) DEVICE FOR PROCESSING THE SOIL

(71) Applicant: MASCHIO GASPARDO S.P.A., Campodarsego (IT)

(72) Inventor: Andrea Maschio, Morsano al Tagliamento (IT)

(73) Assignee: MASCHIO GASPARDO S.P.A., Campodarsego (IT)

( * ) Notice: Subject to any disclaimer, the term of this patent is extended or adjusted under 35 U.S.C. 154(b) by 997 days.

(21) Appl. No.: 17/416,160

(22) PCT Filed: Dec. 23, 2019

(86) PCT No.: PCT/IB2019/061285
§ 371 (c)(1),
(2) Date: Jun. 18, 2021

(87) PCT Pub. No.: WO2020/129030
PCT Pub. Date: Jun. 25, 2020

(65) Prior Publication Data
US 2022/0071075 A1 Mar. 10, 2022

(30) Foreign Application Priority Data
Dec. 21, 2018 (IT) .......................... 102018000020953

(51) Int. Cl.
*A01B 61/04* (2006.01)
*A01B 21/08* (2006.01)
*A01B 23/02* (2006.01)

(52) U.S. Cl.
CPC .......... *A01B 61/044* (2013.01); *A01B 21/086* (2013.01); *A01B 23/02* (2013.01)

(58) Field of Classification Search
CPC ...... A01B 21/086; A01B 23/02; A01B 61/044
See application file for complete search history.

(56) References Cited

U.S. PATENT DOCUMENTS 2,627,798 A * 2/1953 Graham ............... A01B 61/046
 172/708
2,833,198 A * 5/1958 Graham ................. A01B 35/24
 172/710

(Continued)

FOREIGN PATENT DOCUMENTS

| EP | 1551213 B1 | 8/2007 |
| EP | 2625944 A1 | 8/2013 |
| WO | 9421105 A1 | 9/1994 |

*Primary Examiner* — Christopher J Sebesta
*Assistant Examiner* — Joel F. Mitchell
(74) *Attorney, Agent, or Firm* — Volpe Koenig

(57) ABSTRACT

A device for processing the soil having a frame which carries at least one processing tool and a resilient element which has a first end portion which is associated with the processing tool and a second end portion which is associated with the frame by connection devices. The connection devices have a first laminar element which is arranged in an upper position with respect to the second end portion of the resilient element and a second laminar element which is arranged in a lower position with respect to the second end portion. The connection devices further include a separator device arranged between the first laminar element and the second laminar element which is capable of forming a separation between the second end portion and the laminar elements which defines a cavity between the first laminar element and the second laminar element, inside which the resilient element can bend.

13 Claims, 3 Drawing Sheets

(56) References Cited

U.S. PATENT DOCUMENTS

| | | | | |
|---|---|---|---|---|
| 2,944,613 A | * | 7/1960 | Anderson | A01B 61/046 172/708 |
| 3,098,529 A | * | 7/1963 | Wade et al. | A01B 61/046 172/705 |
| 3,431,982 A | * | 3/1969 | Wassill | A01B 35/24 172/265 |
| 3,981,367 A | | 9/1976 | Mydels | |
| 4,143,718 A | * | 3/1979 | Quanbeck | A01B 61/046 172/705 |
| 4,738,316 A | * | 4/1988 | Wood | A01B 21/086 172/603 |
| 4,815,544 A | * | 3/1989 | Good | A01B 39/22 172/603 |
| 4,928,774 A | * | 5/1990 | Bell | A01B 21/086 172/603 |
| 5,259,460 A | * | 11/1993 | Evers | A01B 49/02 172/569 |
| 6,158,523 A | | 12/2000 | Gengler et al. | |
| 2020/0170167 A1 | * | 6/2020 | Hughes | A01B 49/027 |

\* cited by examiner

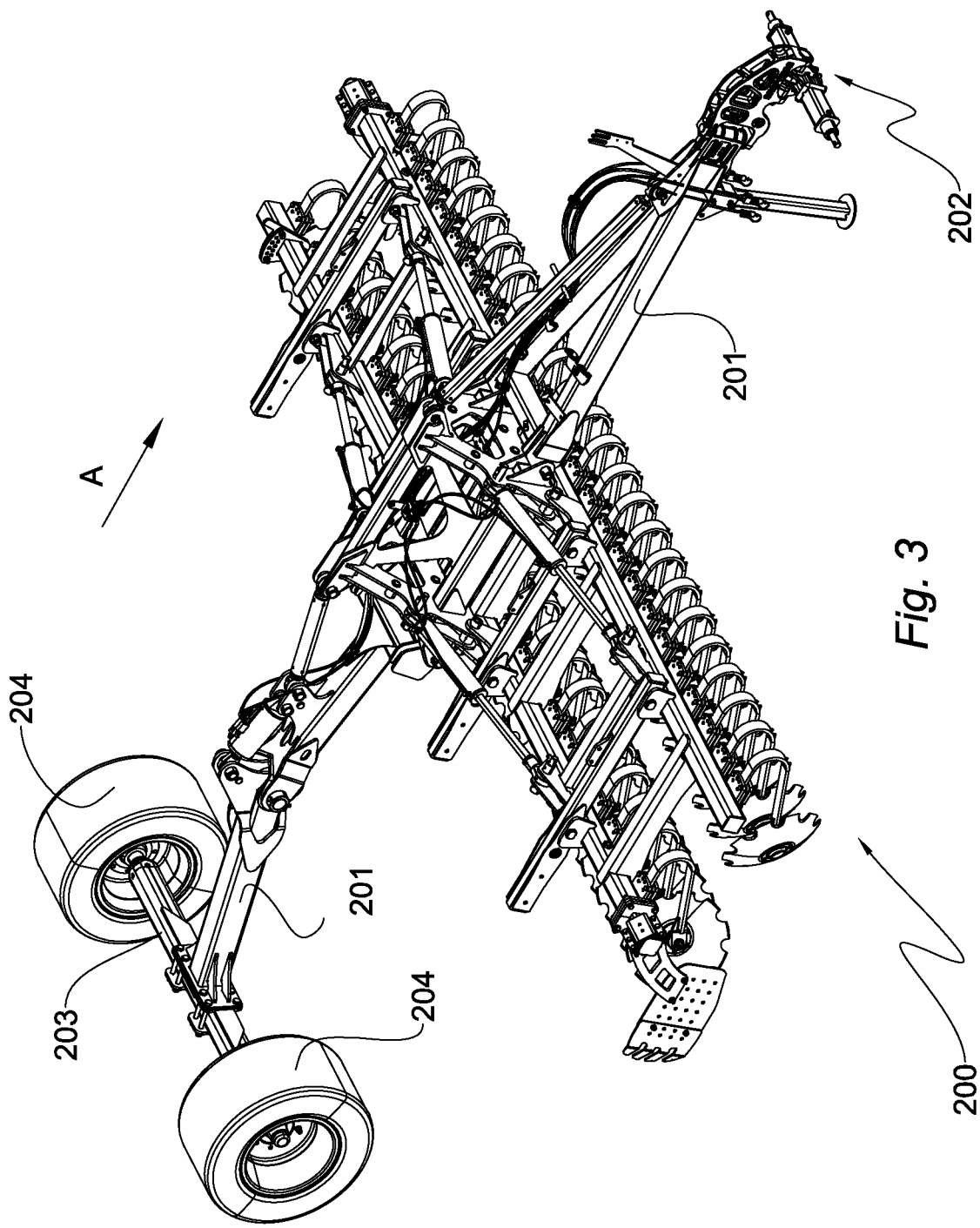

DEVICE FOR PROCESSING THE SOIL

The present invention relates to a device for processing the soil during use in agricultural machines.

Agricultural machines which are generally used to process the soil can be of various types in relation to the particular use for which they are intended; in particular, they may have a tractor, to which there is connected a drawing unit, which is in some cases provided with non-motorized wheels and which has one or more supports or frames, on which processing tools of various types are arranged in relation to the particular processing operation to be carried out.

With particular regard to agricultural machines which are intended for processing operations for tilling the ground, the tools used are generally connected to the supports or frames which belong to the drawing unit by means of mechanical connection elements which allow the relative movement of the tool with respect to the ground during the processing steps.

U.S. Pat. No. 6,158,523 discloses a system for assembling disks for processing the soil, in which the attachment of each disk to a bar is carried out by means of a dedicated leaf spring. Each leaf spring is fixed both to an upper end of the bar and to a disk, in such a manner that the disk is positioned at least partially beside an end portion of the spring.

The document EP 1 551 213 sets out a machine for tilling the soil of the type comprising a frame which is provided with tools for processing the soil which are constituted by non-motorized rotating disks. The system described provides for a safety device which allows the disk to move when the pressure applied to the disk is greater than a predetermined pressure. The Applicant has observed, firstly, that the tools used for processing operations involving tilling the soil, being in direct contact with the ground itself, are subjected to great stresses which act in various possible directions.

Particularly during the advance of the agricultural machine in a particular direction, during the step of processing the soil, the stresses acting on the tools which are used can be applied thereto both in a direction which is substantially perpendicular to the ground, that is to say, in a vertical direction, and in directions which are transverse to the advance direction of the agricultural machine itself.

In particular, the stresses which result from the interaction between the tool and ground as a result of the resistance by the ground and any obstacles or roughness present along the travelled trajectory of the tool itself provide a stress component in a transverse direction with respect to the advance direction of the tool during the processing step.

The Applicant has further verified that the transverse stresses can generate a twisting moment on the structures which support the tools and which are further intended for the connection thereof to the structure of the frame of the drawing unit.

The Applicant has further recognized that the whole of the stresses, to which the tools are subjected during the individual life cycle, involves a premature deterioration both of the tools themselves and of the structures, to which they are connected.

In particular, the Applicant has recognized the need for improving the resistance to stresses which act on the processing tools in respect of the elements which are intended to receive and connect the tools themselves to the drawing structure.

The Applicant has realized that this objective can be achieved by modifying the structure of the devices used to connect the resilient elements which are intended to receive the processing tools to the carrier frame.

Finally, the Applicant has found that, by providing suitable separator devices in the region of an end zone of the resilient elements which are intended to receive the processing tools and to connect them to a frame of the drawing unit, the resistance to stresses acting on the processing tools is substantially increased.

In particular, in a first aspect thereof, the invention relates to a device for processing the soil during use in agricultural machines comprising a frame which carries at least one processing tool, at least one resilient element which has a first end portion which is associated with the processing tool and a second end portion which is associated with the frame by means of connection devices.

Preferably, the connection devices comprise at least a first laminar element which is arranged in an upper position with respect to the second end portion of the resilient element and at least a second laminar element which is arranged in a lower position with respect to the second end portion. It will be appreciated that the references upper and lower are intended to be understood to refer to the vertical direction and a condition for use in which the equipment is supported on a piece of ground to be processed.

Preferably, the connection devices comprise at least one separator device which is arranged between the first laminar element and the second laminar element, in the region of the second end portion of the resilient element, and which is capable of forming at least one separation between the second end portion and the laminar elements which defines a cavity between the first laminar element and the second laminar element, inside which the resilient element can bend towards/away from the first or second laminar element.

The characteristics and advantages of the invention will be better appreciated from the detailed description of a preferred embodiment thereof, which is illustrated by way of non-limiting example with reference to the appended drawings, in which:

FIG. 3 is a perspective overall view of a possible embodiment for a drawing unit, which is provided with a device for processing the soil according to the present invention.

Figure 1:
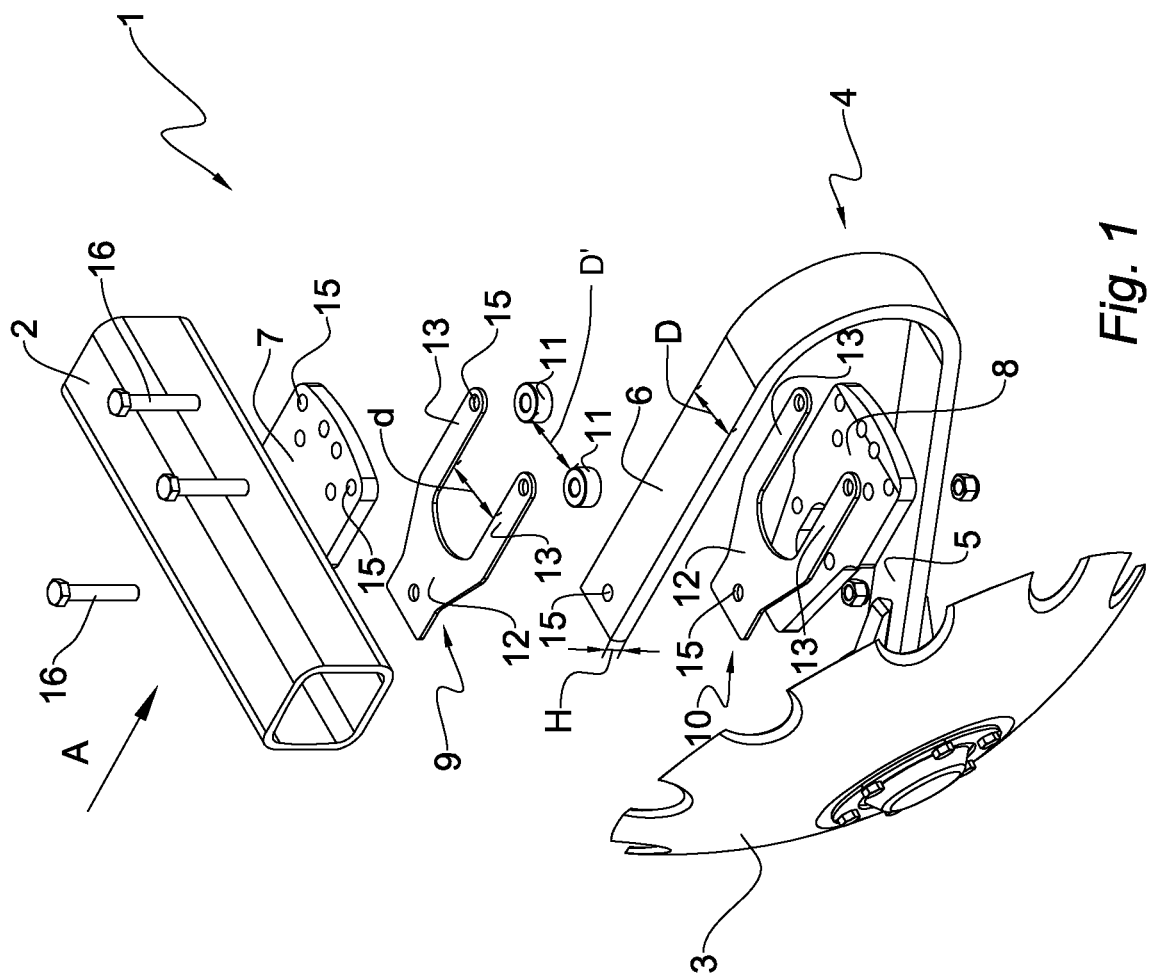
FIG. 1 is a perspective, exploded view of a detail of a preferred embodiment of a device for processing the soil according to the present invention.

Initially with reference to FIG. 3, there is generally designated 200 a drawing unit which, in a preferred embodiment thereof, is capable of supporting processing tools 3, which are illustrated in FIG. 1, and of allowing the movement thereof during the movement of a tractor (not shown in the Figures), to which it can be connected in a releasable manner.

In particular, the drawing unit 200 comprises a device 1 for processing the soil according to the present invention.

As shown in FIG. 3, in some embodiments the drawing unit 200 may have a central member 201 which is arranged longitudinally with respect to an advance direction A which substantially constitutes the carrier structure thereof and which has, in the region of an individual end, a connection device 202 which is capable of connecting the drawing unit 200 to the tractor.

In some embodiments, the central member 201 may support, near the opposite end with respect to the one provided with the connection device 202, a shaft 203 to which there is keyed a wheel unit 204, which is preferably non-motorized, which allow the movement of the drawing unit 200 during the advance of the tractor in the advance direction A. It will be appreciated that the present application may also be used in devices for processing the soil which are not provided with wheels.

The central member 201 further supports at least one frame 2 which is arranged in a direction which is substantially perpendicular to the central member 201 itself, the frame 2 being intended to provide and support at least one processing tool 3, as can be seen in FIG. 1.

Preferably, the frame 2 supports a plurality of processing tools 3, which may also be different from each other, in accordance with the particular working requirements.

Alternatively, the central member 201 may support different frames 2 which are arranged in succession.

FIG. 3 shows a preferred embodiment of the drawing unit 200 comprising a pair of frames 2 which are connected to the central member 201 near the centre thereof.

The frame 2 comprises means for supporting processing tools 3 which are preferably arranged beside each other in a direction substantially parallel with the advance direction A.

In a preferred embodiment of the invention, for use in processing operations for tilling the soil, the processing tools 3 are constituted as non-motorized rotating disks which are connected to the frame 2 of a disk harrow.

Preferably, the disks have a surface with a concavity facing the hub which supports them.

The disks may comprise a circumferential edge which is provided with shaped recesses which are capable of improving the process of tilling the soil.

Preferably, the disks are inclined with respect to the surface of the ground at an angle between 25° and 17°.

Now with particular reference to FIG. 1, in order to produce a support for the processing tools 3 and to allow the movement thereof with respect to the ground, there is provided a resilient element 4 which extends from the frame 2 towards the tool and which can be connected thereto, preferably near a first end portion 5 thereof.

With particular reference to the preferred embodiment, each disk is preferably arranged on a relevant hub, which is connected to the resilient element 4 near the above-mentioned first end portion 5.

Each resilient element 4 is further associated with the frame 2 near an individual second end portion 6 by means of suitable connection devices.

The resilient element 4 may be constituted by a drawn member with a polygonal cross-section, preferably of parallelepipedal form, which is produced in accordance with various possible profiles; in a possible embodiment, it is substantially U-shaped.

Preferably, the resilient element 4 is constituted by a leaf spring.

In a preferred embodiment, the connection devices which allow an association of the resilient element 4 with the frame 2 comprise a first laminar element 7 which is arranged in an upper position with respect to the second end portion 6 of the resilient element 4.

The connection devices further comprise a second laminar element 8 which is arranged in a lower position with respect to the second end portion 6.

The laminar elements 7, 8 may, for example, be constituted by metal plates or other non-flexible material and have through-holes 15, in which suitable fixing elements 16 can be engaged.

There is further provided at least one separator device 100 which is arranged between the first laminar element 7 and the second laminar element 8 and which defines a separation between the second end portion 6 and the laminar elements 7, 8.

In particular, the separator device 100 allows the definition of a cavity 101 between the laminar elements so that the resilient element 4 can bend towards/away from the first or second laminar element inside the cavity 101 itself.

In this manner, the resistance of the device is increased with respect to the stresses generated by the interaction of the tool with the ground during the processing step, in particular by substantially decreasing the twisting moment acting on the resilient element 4.

According to an aspect of the invention, the second end portion 6 comprises a portion which, during use, faces the first laminar element 7 and the second laminar element 8 at opposite surfaces, respectively. Two zones are defined in this portion facing the laminar elements 7, 8. In one of these zones, the second end portion 6 is retained against the laminar elements 7, 8 while, in the other zone, there is defined a separation space between the surface of the second end portion 6 and the laminar element which the respective surface faces.

According to some embodiments, such as the one in the example depicted, the separator device 100 comprises a first shaped plate 9 and a second shaped plate 10. The shaped plates are arranged in contact with the first laminar element and second laminar element, respectively.

Preferably, the shaped plates 9, 10 have an equivalent formation which comprises a first portion 12 and two second portions 13 of elongate form which extend from the first portion 12 substantially parallel with each other. In this manner, there are produced shaped plates 9, 10 which are provided with a portion which is preferably U-shaped.

Preferably, the two second portions 13 are constructed so as to have lateral surfaces 14 which face each other and which are separated by a separation distance d.

Preferably, this distance d is between 66.5 mm and 86.5 mm.

In this manner, there is produced a separation between the second end portion 6 of the resilient element 4 and the laminar elements 7, 8, which defines a cavity 101 between the first laminar element and the second laminar element.

However, the resilient element 4 has a transverse dimension D, the extent of which is less than the extent of the distance d, at least near the individual second end portion 6, and is between 60 mm and 80 mm.

Preferably, the ratio D/d is between 1.11 and 1.08.

This particular formation allows a given freedom of movement of the resilient element 4, which can therefore bend towards/away from the laminar elements 7, 8.

Two spacers 11 are further advantageously arranged between the shaped plates.

Preferably, the spacers 11 have a thickness h which has a dimension which is greater than or equal to the dimension of a thickness H of the resilient element 4, measured near the second end portion 6.

The spacers 11 can advantageously be produced from deformable rigid material so as to partially absorb the stresses to which the separator device 100 is subjected during the soil processing steps.

In a preferred embodiment, the spacers 11 are produced from steel. It will be appreciated in any case that different materials may also be used, for example, plastics material or rubber, for the spacers 11.

In some embodiments, the spacers 11 are of cylindrical form.

Preferably, there is defined between the spacers 11 a distance D' which substantially corresponds to the transverse dimension D of the resilient element.

Figure 2:
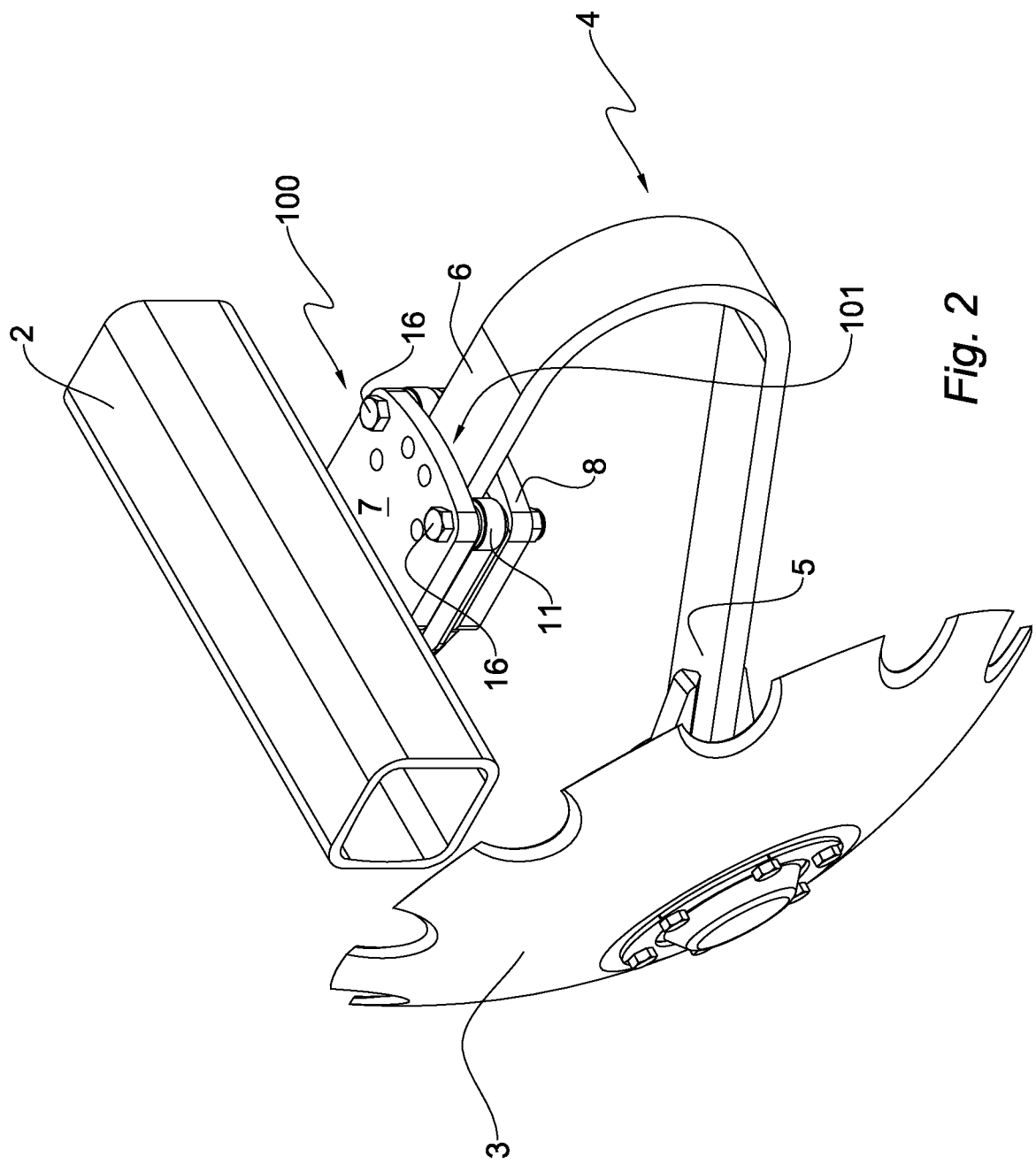
FIG. 2 is a perspective view of a detail of the device of FIG. 1, in an assembled configuration.

On the basis of an aspect of the invention, there are allowed torsion movements about an axis which is substantially parallel with the advance direction A, and flexion movements about a substantially horizontal axis, which is perpendicular thereto, of the second portion 6 of the resilient element 4 inside the cavity 101, but there being prevented flexion movements about a substantially vertical axis. In the assembled configuration of the device 1 for processing the soil, as illustrated in FIG. 2, the first laminar element 7 is placed in an upper position in contact with the first shaped plate 9, to which it is connected by means of fixing elements 16 which are engaged in through-holes 15. These through-holes are advantageously formed both in end portions of the elongate second portions 13 and in the first portion 12 of the first shaped plate 9, and in the first laminar element 7, in a manner adjacent to the respective holes 15 which are present in the first shaped plate 9.

Conversely to the above-described elements, the second laminar element 8 is placed in a lower position in contact with the second shaped plate 10, to which it is connected by means of fixing elements 16 which are engaged in through-holes 15. Those through-holes are advantageously constructed both in end portions of the elongate second portions 13 and in the first portion 12 of the second shaped plate 10 and in the second laminar element 8, in a manner adjacent to the holes 15 which are present in the second shaped plate 10.

In this configuration, the spacers 11 are positioned between the first and second shaped plates 9, 10 near the mutual through-holes 15 which are formed in the end portions of the second elongate portions 13.

Preferably, the connection devices are arranged below the frame 2 and are associated therewith so that a portion of the upper surface of the first laminar element 7 is arranged in contact with the frame 2 itself.

Advantageously, the portion of the upper surface in contact with the frame 2 represents at least 50% of the total surface of the first laminar element 7 itself.

Preferably, the portion of the upper surface in contact with the frame 2 is less than 90% of the total surface of the first laminar element 7 itself.

The present invention has been described with reference to a number of preferred embodiments. Different modifications can be applied to the above-described embodiments while still remaining within the scope of protection of the invention which is defined by the appended claims.

The invention claimed is:

1. A device for processing soil comprising:
a frame which carries a processing tool;
a resilient element which has a first end portion connected to the processing tool and a second end portion connected to the frame by a connection device;
wherein the connection device comprises:
a first laminar element and a second laminar element, the second end portion of the resilient element being interposed between the first laminar element and the second laminar element, the first laminar element and the second laminar element being disposed above and below the resilient element, respectively;
a separator arranged between the first laminar element and the second laminar element in a region of the second end portion of the resilient element, and the separator forming a separation between the second end portion and the laminar elements, the separation defining a cavity between the first laminar element and the second laminar element, wherein the resilient element is bendable in a vertical direction towards and away from the first or second laminar elements inside the cavity itself;
a first shaped plate and a second shaped plate in contact with the first laminar element and the second laminar element, respectively;
the first shaped plate and the second shaped plate each comprise a first portion and two second portions of elongate form, the second portions extending from the first portion in a manner substantially parallel with each other;
the second portions have lateral surfaces facing each other and which are separated by a separation distance; and
the resilient element has a transverse dimension, an extent of which is less than the separation distance, at least in proximity of the second end portion.

2. The device according to claim 1, wherein the separation distance is between 66.5 mm and 86.5 mm.

3. The device according to claim 1, wherein the transverse dimension is between 60 mm and 80 mm.

4. The device according to claim 1, wherein the ratio of the transverse dimension and the separation distance is comprised between 1.11 and 1.08.

5. The device according to claim 1, wherein the connection device is arranged lower than the frame and connected thereto so that a portion of an upper surface of the first laminar element is positioned in contact with the frame.

6. The device according to claim 1, wherein the first laminar element is arranged, during use, when the device is supported on the ground, in an upper position with respect to the second end portion of the resilient element and the second laminar element is arranged, during use, in a lower position with respect to the second end portion.

7. The device according to claim 1, wherein the second end portion comprises a portion having opposite surfaces, the opposite surfaces, during use, facing the first laminar element and the second laminar element, respectively, there being defined in the portion having one of the opposite surfaces facing the laminar elements two zones, the second end portion being maintained against the laminar elements in a first zone of the two zones, and there being defined a separation space between each of the opposite surfaces and the first laminar element and the second laminar element, respectively, in a second zone of the two zones.

8. A device for processing soil comprising:
a frame which carries a processing tool;
a resilient element which has a first end portion connected to the processing tool and a second end portion connected to the frame by a connection device;
wherein the connection device comprises:
a first laminar element and a second laminar element, the second end portion of the resilient element being interposed between the first laminar element and the second laminar element, the first laminar element and the second laminar element being disposed above and below the resilient element, respectively;
a separator arranged between the first laminar element and the second laminar element in a region of the second end portion of the resilient element, and the separator forming a separation between the second end portion and the laminar elements, the separation defining a cavity between the first laminar element and the second laminar element, wherein the resilient element is bendable in a vertical direction towards and away from the first or second laminar elements inside the cavity itself;

wherein the frame is elongated and has a longitudinal direction, the separator being configured so as to allow torsion movements about an axis which is substantially parallel with the longitudinal direction of the frame, and flexion movements about a substantially horizontal axis, which is perpendicular thereto, of the second end portion of the resilient element inside the cavity, but there being prevented flexion movements about a substantially vertical axis.

9. A device for processing the soil comprising:
a frame which carries a processing tool;
a resilient element having a first end portion connected to the processing tool and a second end portion connected to the frame by a connection device;
wherein the connection device comprises:
a first laminar element and a second laminar element, the second end portion of the resilient element being interposed between the first laminar element and the second laminar element;
a separator arranged between the first laminar element and the second laminar element in a region of the second end portion of the resilient element, the separator forming a separation between the second end portion and the laminar elements, the separation defining a cavity between the first laminar element and the second laminar element, wherein the resilient element can bend towards to and away from the first or second laminar element inside the cavity itself, the separator comprising a first shaped plate in contact with the first laminar element and a second shaped plate in contact with the second laminar element, wherein the separator comprises at least two spacers positioned between the first shaped plate and the second shaped plate.

10. The device according to claim 9, wherein the at least two spacers have through-holes which are capable of receiving fixing elements.

11. The device according to claim 10, wherein the at least two spacers are positioned between the first shaped plate and the second shaped plate near the through-holes, the first shaped plate and the second shaped plate each comprise a first portion and two second portions of elongate form, the second portions extending from the first portion in a manner substantially parallel with each other, and the through-holes are formed in end portions of the second portions of the elongate form.

12. The device according to claim 10, wherein there is defined between the spacers a distance which substantially corresponds to a transverse dimension of the resilient element.

13. The device according to claim 9, wherein the at least two spacers are of cylindrical form.

* * * * *